(12) United States Patent
Klein et al.

(10) Patent No.: US 10,519,905 B2
(45) Date of Patent: Dec. 31, 2019

(54) FUEL SYSTEM FOR A MOTOR VEHICLE

(71) Applicant: GM GLOBAL TECHNOLOGY OPERATIONS LLC, Detroit, MI (US)

(72) Inventors: Dale F. Klein, Hartland, MI (US); Manoharan Thiagarajan, Milford, MI (US); William L. Villaire, Clarkston, MI (US); Kristin M. DeMare, Scottsdale, AR (US); Edward J. Strzelecki, Oxford, MI (US); Jeffery J. Milton, Lake Orion, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 28 days.

(21) Appl. No.: 15/921,114

(22) Filed: Mar. 14, 2018

(65) Prior Publication Data

US 2019/0285033 A1 Sep. 19, 2019

(51) Int. Cl.
*F02M 37/10* (2006.01)
*F02M 37/00* (2006.01)
*F02M 37/04* (2006.01)
*B60K 15/03* (2006.01)

(52) U.S. Cl.
CPC ........ *F02M 37/0023* (2013.01); *B60K 15/03* (2013.01); *F02M 37/0047* (2013.01); *F02M 37/0094* (2013.01); *F02M 37/04* (2013.01); *B60K 2015/03243* (2013.01); *B60K 2015/03289* (2013.01); *B60K 2015/03328* (2013.01)

(58) Field of Classification Search
CPC .......... F02M 37/0023; F02M 37/0094; F02M 37/0047; F02M 37/04; B60K 15/03; B60K 2015/03289; B60K 2015/03243; B60K 2015/03328
USPC ................................ 123/495, 509, 522, 523
See application file for complete search history.

(56) References Cited

U.S. PATENT DOCUMENTS

| | | | | |
|---|---|---|---|---|
| 4,860,714 A | * | 8/1989 | Bucci ................... | B60K 15/077 123/514 |
| 6,123,511 A | * | 9/2000 | Sertier ................. | B60K 15/077 123/509 |
| 6,343,589 B1 | | 2/2002 | Talaski et al. | |
| 7,353,807 B2 | * | 4/2008 | Paluszewski ........ | F02M 37/025 123/198 D |
| 2006/0231079 A1 | | 10/2006 | Paluszewski | |
| 2018/0283331 A1 | * | 10/2018 | Porras ................... | B60K 15/03 |

* cited by examiner

*Primary Examiner* — Hai H Huynh
(74) *Attorney, Agent, or Firm* — Cantor Colburn LLP

(57) ABSTRACT

A fuel system for a motor vehicle includes a fuel pump having a first pump outlet connectable to an engine fuel inlet and a second pump outlet, a fuel pump module including an internal volume, a fuel pump module outlet is arranged in the internal volume fluidically connected to the second pump outlet, and a fuel valve is fluidically connected to the second pump outlet. The fuel valve is operable to fluidically isolate the fuel pump from the fuel pump module when fuel in the internal volume reaches a selected fuel level.

15 Claims, 7 Drawing Sheets

FUEL SYSTEM FOR A MOTOR VEHICLE

INTRODUCTION

The subject disclosure relates to the art of motor vehicles and, more particularly, to a fuel system for a motor vehicle.

Motor vehicles typically include an internal combustion (IC) engine that relies on a supply of fuel in order to operate. The fuel is combusted to produce power. The power is output from the IC engine to perform work such as driving a vehicle. The fuel is stored in a fuel tank. Various maneuvers can cause fuel to move away from a fuel pick up in the fuel tank causing a fuel starvation issue. In order to mitigate fuel starvation issues, a fuel module is arranged with the fuel pump. The fuel module includes a reservoir to supply the fuel pump.

The fuel module stores an amount of fuel from the fuel tank in the reservoir that is available for the fuel pump to supply the IC engine regardless of forces on the motor vehicle. A fuel pump may be arranged in the fuel module. The fuel pump directs a first flow of fuel from the fuel module to a fuel input, such as an injector pump at the IC engine. The fuel pump also directs a flow of fuel back into the fuel module to drive a venturi jet pump to fill the module reservoir. While the engine is operating, the fuel pump operates continuously to direct fuel to the fuel input.

It is not, however, necessary to continuously direct fuel back into the fuel module to drive the jet pump filling the module reservoir. Continuous operation at a pressure sufficient to direct fuel to the fuel input and the fuel module puts an unnecessary load on the fuel pump. The unnecessary load could lead to premature wear, unacceptable fuel pump noise, increased heat in the fuel module, and potentially vapor generation as a result of increased heat. Accordingly, it is desirable to provide a system that directs fuel flow to the fuel module only when needed, i.e. when the fuel in the tank or reservoir drops below a predetermined fuel level.

SUMMARY

In one exemplary embodiment, a fuel system for a motor vehicle includes a fuel pump having a first pump outlet connectable to an engine fuel inlet and a second pump outlet, a fuel pump module including an internal volume, a fuel pump module outlet is arranged in the internal volume fluidically connected to the second pump outlet, and a fuel valve is fluidically connected to the second pump outlet. The fuel valve is operable to fluidically isolate the fuel pump from the fuel pump module when fuel in the internal volume reaches a selected fuel level.

In addition to one or more of the features described above or below, or as an alternative, further embodiments could include wherein the fuel pump is arranged in the internal volume.

In addition to one or more of the features described above or below, or as an alternative, further embodiments could include wherein the fuel valve comprises a venturi valve system.

In addition to one or more of the features described above or below, or as an alternative, further embodiments could include wherein the fuel valve comprises a float valve system including a float member connected to an actuator.

In addition to one or more of the features described above or below, or as an alternative, further embodiments could include wherein the fuel valve includes a pintle member operatively connected to the actuator.

In addition to one or more of the features described above or below, or as an alternative, further embodiments could include wherein the fuel valve includes a valve seat selectively receptive of the pintle to fluidically isolate the second pump outlet from the fuel pump module outlet.

In another exemplary embodiment, a motor vehicle includes a body, and an internal combustion engine mechanically supported to the body. The internal combustion engine includes a fuel inlet. A fuel system is fluidically connected to the internal combustion engine. The fuel system includes a fuel pump having a first pump outlet connectable to an engine fuel inlet and a second pump outlet, a fuel pump module including an internal volume, a fuel pump module outlet arranged in the internal volume to fluidically connect to the second pump outlet, and a fuel valve fluidically connected to the second pump outlet. The fuel valve is operable fluidically isolate the fuel pump from the fuel pump module when fuel in the internal volume reaches a selected fuel level.

In addition to one or more of the features described above or below, or as an alternative, further embodiments could include wherein the fuel valve comprises a venturi valve system.

In addition to one or more of the features described above or below, or as an alternative, further embodiments could include wherein the fuel valve comprises a float valve system including a float member connected to an actuator.

In addition to one or more of the features described above or below, or as an alternative, further embodiments could include wherein the fuel valve includes a pintle member operatively connected to the actuator.

In addition to one or more of the features described above or below, or as an alternative, further embodiments could include wherein the fuel valve includes a valve seat selectively receptive of the pintle to fluidically isolate the second pump outlet from the fuel pump module outlet.

In yet another exemplary embodiment, a method of operating a fuel system for a motor vehicle includes activating a fuel pump including a first pump outlet and a second pump outlet, directing a first amount of fuel through the first pump outlet to an engine fuel inlet of an internal combustion engine, directing a second amount of fuel through the second pump outlet to a fuel pump module arranged in a fuel tank of the motor vehicle, detecting that fuel in the fuel pump module has reached a predetermined level, and fluidically isolating the fuel pump module from the second pump outlet when fuel is at the predetermined level.

In addition to one or more of the features described above or below, or as an alternative, further embodiments could include wherein detecting fuel in the fuel pump module as reached the predetermined level includes raising a float member of a float valve.

In addition to one or more of the features described above or below, or as an alternative, further embodiments could include wherein fluidically isolating the fuel pump module includes seating a pintle into a valve seat fluidically connected to the second pump outlet.

In addition to one or more of the features described above or below, or as an alternative, further embodiments could include reducing operating power of the fuel pump when the second pump outlet is fluidically isolated from the fuel pump module.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses. As used herein, the term module may refer to processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
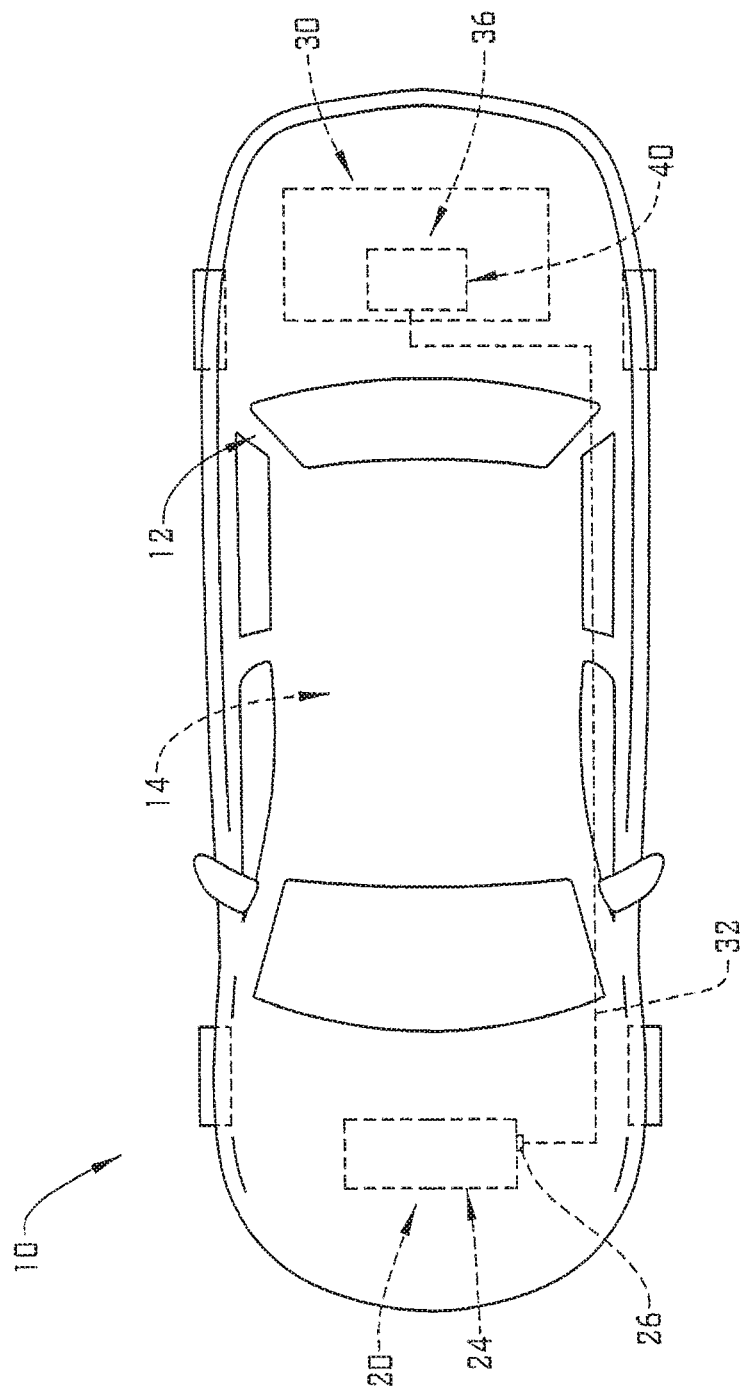
FIG. 1 depicts a motor vehicle including a fuel system, in accordance with an exemplary embodiment.

A motor vehicle, in accordance with an exemplary embodiment, is indicated generally at 10 in FIG. 1. Motor vehicle 10 includes a body 12 that defines, at least in part, a passenger compartment 14. It should be understood that motor vehicle 10 may take on a variety of forms including passenger vehicles, sport utility vehicles (SUVs), trucks, farm equipment, or other mechanisms.

Motor vehicle 10 includes a prime mover 20 that takes the form of an internal combustion (IC) engine 24. IC engine 24 may be a gasoline powered engine, a diesel powered engine or a hybrid engine that functions on both liquid fuel and electricity. IC engine 24 includes an engine fuel inlet 26 that receives liquid fuel from a fuel tank 30 supported in body 12 via a fuel line 32. Engine fuel inlet 26 may take on a variety of forms including an injector pump that may feed fuel injectors (not shown) or a carburetor in the case of an aspirated engine. A fuel system 36 directs fuel from fuel tank 30 to engine fuel inlet 26 via fuel line 32.

Figure 2:
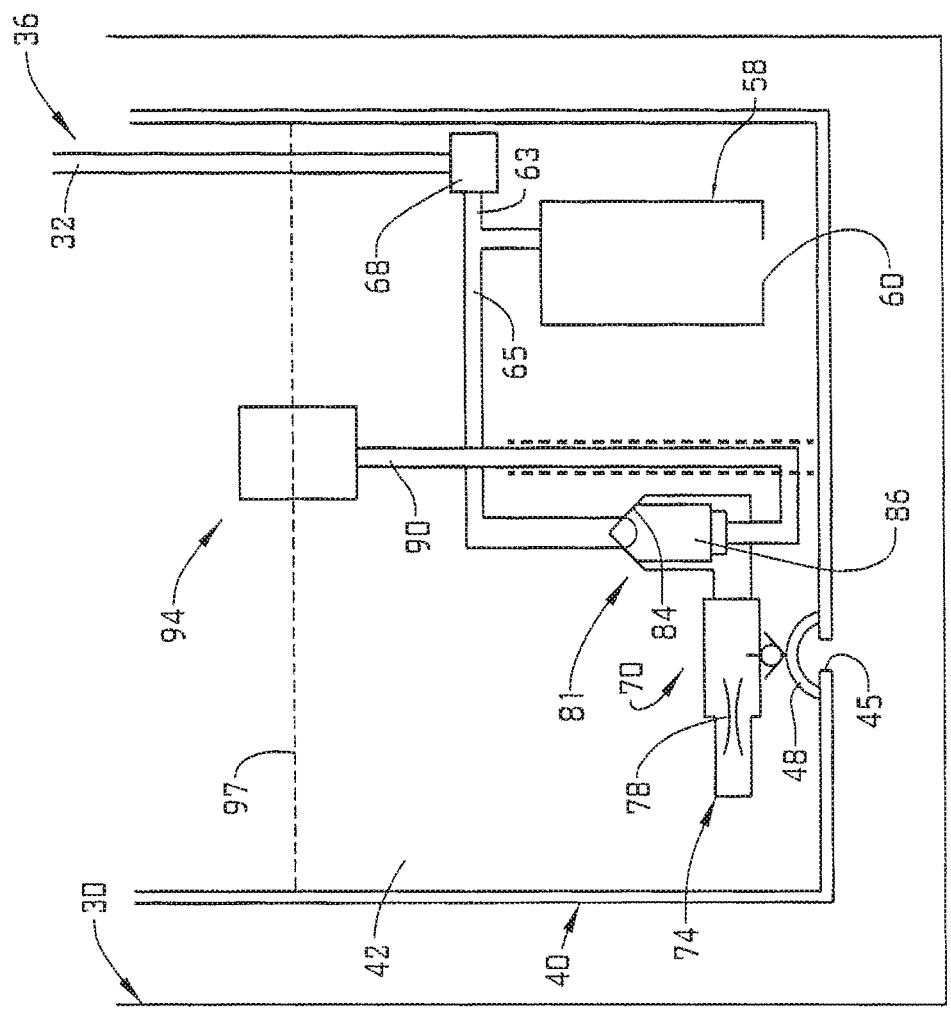
FIG. 2 depicts the fuel system of FIG. 1, illustrating a fuel valve in a closed position, in accordance with an aspect of an exemplary embodiment.
Figure 3:
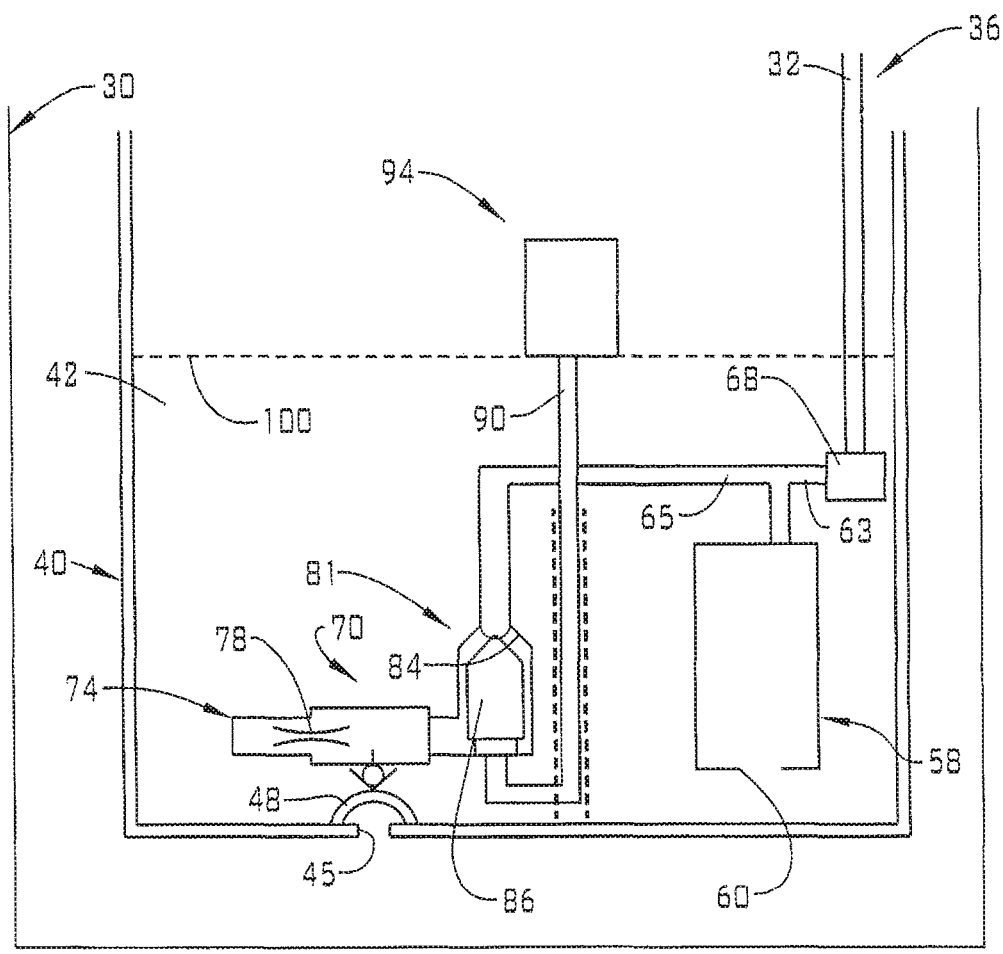
FIG. 3 depicts a portion of the fuel system of FIG. 2 illustrating the fuel valve in an open position, in accordance with an exemplary embodiment.

In accordance with an exemplary embodiment illustrated in FIGS. 2 and 3, fuel system 36 includes a fuel pump module 40 having an internal volume 42 that stores an amount of fuel (not separately labeled). Fuel pump module 40 includes an inlet 45 having an umbrella valve 48 that allows fuel to flow from fuel tank 30 into fuel pump module 40 to fill internal volume 42. If fuel in fuel tank 30 drops below a level of fuel pump module 40, umbrella valve 48 prevents fuel in internal volume 42 from running out of inlet 45.

In the exemplary embodiment shown, a fuel pump 58 is arranged in internal volume 42. Fuel pump 58 includes a pump inlet 60, a first pump outlet 63 and a second pump outlet 65. First pump outlet 63 is fluidically connected to fuel line 32 via a manifold 68. Second pump outlet 65 is connected to a fuel valve 70 having a fuel pump module outlet 74 that directs fuel into fuel pump module 40. In the exemplary embodiment shown, fuel pump module outlet 74 may take the form of a jet pump orifice 78.

In further accordance with an exemplary aspect, fuel valve 70 takes the form of a float valve system 81 including a valve seat 84 and a pintle member 86. Pintle member 86 is selectively engaged with valve seat 84 based on fuel level in fuel pump module 40. When pintle member 86 is engaged with valve seat 84 second pump outlet 65 is fluidically isolated from interior volume 42. Towards that end, pintle member 86 is mechanically connected to an actuator 90 that supports a float member 94.

When fuel in internal volume 42 is at a selected closing level such as indicated at 97, pintle member 86 engages valve seat 84 cutting off fuel flow through second pump outlet 65. At this time, power to fuel pump 58 may be reduced as fuel demand has been reduced. When fuel in internal volume 42 falls to a selected opening level 100 as shown in FIG. 3, pintle member 86 may unseat and fuel may flow through second pump outlet 65 to fuel pump module outlet 74. It should be understood that the selected closing level 97 and the selected opening level 100 main include a hysteresis that ensures, for example, fuel does not fall too far below selected opening level 100. The float valve system 81 may be opened via increased load output of fuel pump 58, where buoyancy of float member 94 is overcome by a hydraulic force acting on pintle member 86, which opens fuel valve 70 and allows flow to drive fuel pump module 74.

Figure 4:
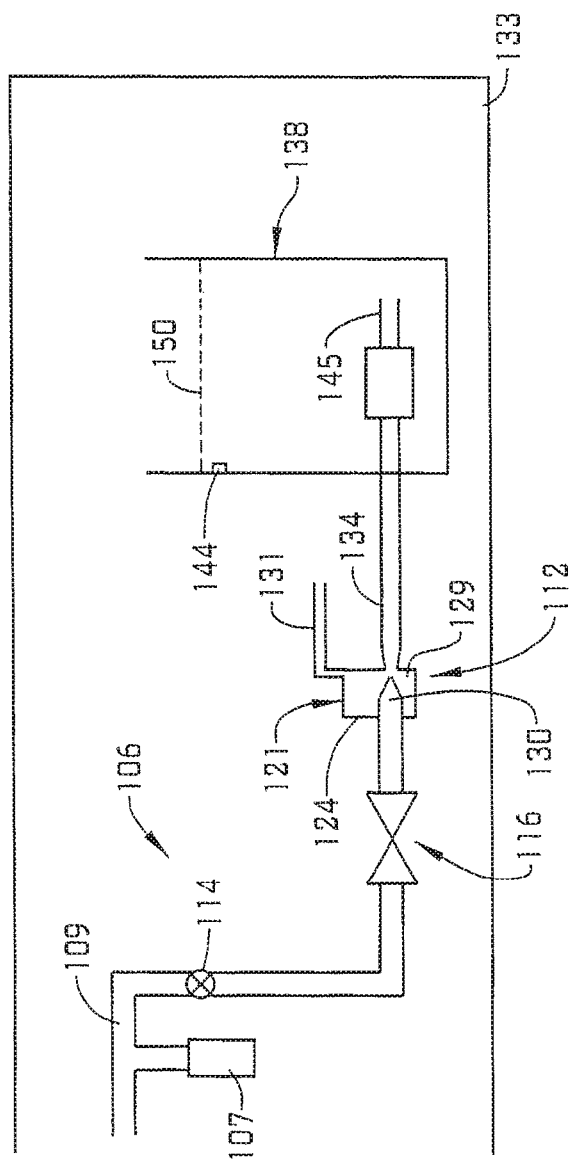
FIG. 4 depicts a fuel system, in accordance with another aspect of an exemplary embodiment.

Reference will now follow to FIG. 4 in describing a fuel system 106 in accordance with another aspect of an exemplary embodiment. Fuel system 106 includes a fuel pump 107 having a first pump outlet (not separately labeled) and a second pump outlet 109. Second pump outlet 109 is fluidically connected to a fuel pump module inlet 112 through a fuel valve 114. A pressure relief valve 116 may be fluidically arranged between fuel valve 114 and fuel pump module inlet 112. In the exemplary embodiment shown, fuel pump module inlet 112 may take the form of a venturi valve system 121 including a manifold 124 having an interior portion 129. A venturi 130 extends into interior portion 129 and fluidically connects with fuel valve 114.

Manifold 124 includes an inlet 131 that may receive bulk fuel from a fuel tank reservoir 133 and an outlet 134 that directs fuel into a fuel pump module 138 that may include a sensor 144. Sensor 144 is positioned to detect when fuel in fuel pump module 138 is below a selected fuel level 150. While shown as being outside of fuel pump module 138, it should be understood that fuel pump 107 may also reside in fuel pump module 138. Fuel pump module 138 houses a fuel delivery element 145 that directs fuel to prime mover 20.

Figure 5:
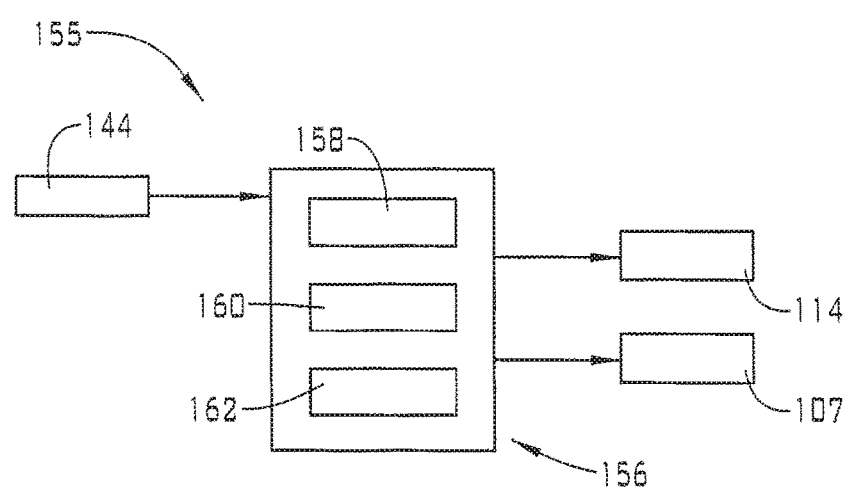
FIG. 5 depicts a block diagram illustrating a control system for the fuel system of FIG. 4.

Fuel valve 114 and sensor 144 may be connected to a controller 155 illustrated in FIG. 5. Fuel pump 107 may also be connected to controller 155. Controller 155 may include a central processor unit (CPU) 158, a memory module 160 and a valve control module 162. Memory module 160 contains a set of instructions for directing valve control module 162 to operate fuel valve 114. Fuel valve 114 may be operated electrically by direct signal of controller 155, or may be opened via increased load output of fuel pump 107, which opens fuel valve 114 and allows flow to drive venturi valve system 121. For example, when fuel in fuel pump module 138 drops below selected fuel level 150, valve 114 may be opened to direct a flow of fuel from fuel pump 107, through second pump outlet 109 to fuel pump module outlet 112. Fuel pressure passing venturi valve system 121 causes a flow of fuel to pass from inlet 131 through outlet 134 into fuel pump module 138. Once the level of fuel has exceeded selected fuel level 150, fuel valve 114 may be closed. When fuel valve 114 is closed, power to fuel pump 107 may lowered due to a reduction in fuel demand.

Figure 6:
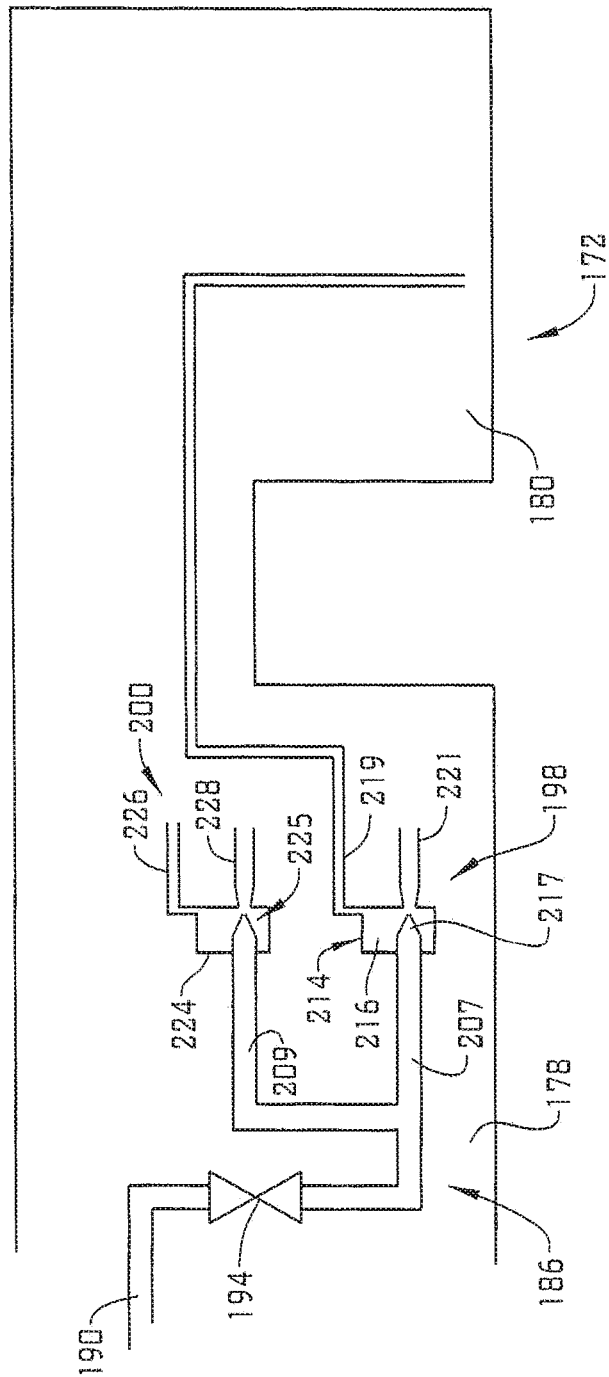
FIG. 6 depicts a fuel system, in accordance with yet another aspect of an exemplary embodiment.

FIG. 6 depicts a saddle type fuel tank 172 having a first reservoir portion 178 and a second reservoir portion 180. A fuel system, in accordance with another aspect of an exemplary embodiment, is illustrated at 186 in first reservoir portion 178. Fuel system 186 includes a second pump outlet 190 connected to a fuel pump (not shown). The fuel pump may also include a first pump outlet (also not shown) similar to that described herein with reference to FIG. 2. Second pump outlet 190 is fluidically connected to a fuel valve 194 which, in turn, is fluidically connected to a first venturi valve system 198 and a second venturi valve system 200. More specifically, a first conduit 207 may extend between fuel valve 144 and first venturi valve system 198 and a second conduit 209 may extend between fuel valve 144 and second venturi valve system 200.

First venturi valve system 198 includes a first manifold 214 having an interior portion 216. A first venturi 217 extends into interior portion 216 and fluidically connects with first conduit 207. Manifold 214 includes an inlet 219 fluidically connected to second reservoir portion 180 and an outlet 221 that is fluidically connected to first reservoir portion 178. Second venturi valve system 200 includes a second manifold 224 having an interior portion (not separately labeled). A second venturi 225 extends into the interior portion and fluidically connects with second conduit 209. Manifold 224 includes an inlet 226 fluidically connected to first reservoir portion 178 and an outlet 228 that is fluidically connected to a fuel pump module (not shown), that may be similar to that shown in FIG. 4, which directs fuel to prime mover 20.

Fuel valve 194 may be selectively activated, based on fuel level in the fuel pump module, to cause a flow of fuel to pass to first venturi valve system 198 to pull fuel from second reservoir portion 180 and to second venturi valve system 200 to direct fuel into the fuel pump module in a manner similar to that discussed herein.

Figure 7:
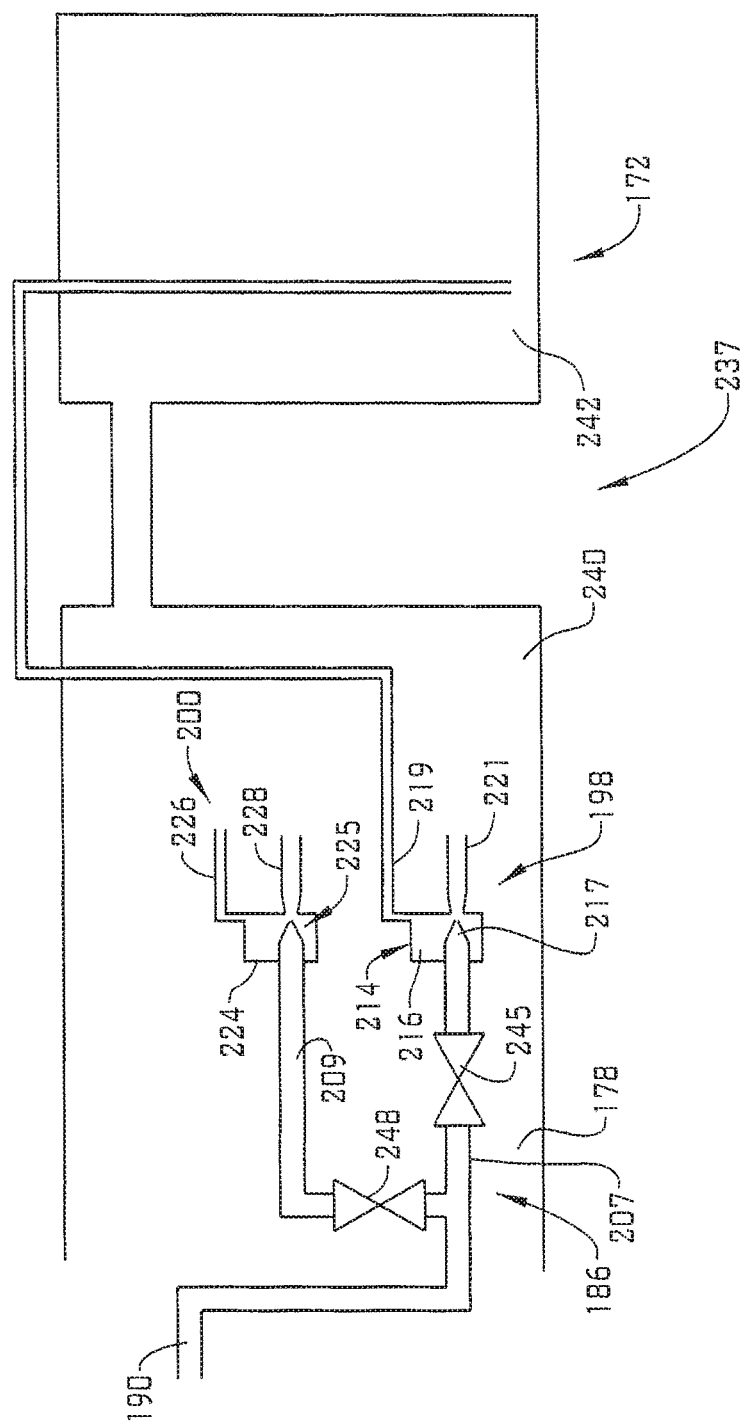
FIG. 7 depicts a fuel system, in accordance with still yet another aspect of an exemplary embodiment.

Reference will now follow to FIG. 7, wherein like reference numbers will represent corresponding parts in the respective views. FIG. 7 depicts a two chamber fuel tank 237 having a first reservoir portion 240 and a second reservoir portion 242. In the exemplary embodiment shown, in lieu of using a single fuel valve such as described in connection with FIG. 6, a first fuel valve 245 may be arranged on first conduit 207 and a second fuel valve 248 may be arranged on second conduit 209. First and second fuel valves 245 and 248 may be selectively activated to transfer fuel from second reservoir portion 242 to first reservoir portion 240 and/or direct fuel into the fuel pump module in a manner similar to that discussed herein At this point, it should be understood that the exemplary embodiments describe a system for controlling operation of a fuel pump based on fuel level in a fuel pump module. By fluidically disconnecting the fuel pump from the fuel pump module when sufficient fuel is present, wear and tear on the fuel pump may be reduced. Further, operating the fuel pump on reduced power may reduce noise, and also heat generation, and thereby reduce vapor production.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A fuel system for a motor vehicle comprising:
  a fuel pump including a first pump outlet connectable to an engine fuel inlet and a second pump outlet;
  a fuel pump module including an internal volume;
  a fuel pump module outlet arranged in the internal volume fluidically connected to the second pump outlet; and
  a normally open (NO) fuel valve fluidically connected to the second pump outlet, the NO fuel valve being operable to fluidically isolate the fuel pump from the fuel pump module when fuel in the internal volume reaches a selected fuel level.

2. The fuel system for a motor vehicle according to claim 1, wherein the fuel pump is arranged in the internal volume.

3. The fuel system for a motor vehicle according to claim 1, wherein the NO fuel valve comprises a venturi valve system.

4. The fuel system for a motor vehicle according to claim 1, wherein the NO fuel valve comprises a float valve system including a float member connected to an actuator.

5. The fuel system for a motor vehicle according to claim 4, wherein the NO fuel valve includes a pintle member operatively connected to the actuator.

6. The fuel system for a motor vehicle according to claim 5, wherein the NO fuel valve includes a valve seat selectively receptive of the pintle member to fluidically isolate the second pump outlet from the fuel pump module outlet.

7. A motor vehicle comprising:
  a body;
  an internal combustion engine mechanically supported to the body, the internal combustion engine including a fuel inlet; and
  a fuel system fluidically connected to the internal combustion engine, the fuel system comprising:
    a fuel pump including a first pump outlet connectable to an engine fuel inlet and a second pump outlet;
    a fuel pump module including an internal volume;
    a fuel pump module outlet arranged in the internal volume to fluidically connected to the second pump outlet; and
    a normally open (NO) fuel valve fluidically connected to the second pump outlet operable fluidically isolate the fuel pump from the fuel pump module when fuel in the internal volume reaches a selected fuel level.

8. The motor vehicle according to claim 7, wherein the NO fuel valve comprises a venturi valve system.

9. The motor vehicle according to claim 7, wherein the NO fuel valve comprises a float valve system including a float member connected to an actuator.

10. The motor vehicle according to claim 9, wherein the NO fuel valve includes a pintle member operatively connected to the actuator.

11. The motor vehicle according to claim 10, wherein the NO fuel valve includes a valve seat selectively receptive of the pintle member to fluidically isolate the second pump outlet from the fuel pump module outlet.

12. A method of operating a fuel system for a motor vehicle comprising:
- activating a fuel pump including a first pump outlet and a second pump outlet;
- directing a first amount of fuel through the first pump outlet to an engine fuel inlet of an internal combustion engine;
- directing a second amount of fuel through the second pump outlet to a fuel pump module arranged in a fuel tank of the motor vehicle;
- detecting that fuel in the fuel pump module has reached a predetermined level; and
- fluidically isolating the fuel pump module from the second pump outlet by closing a normally open (NO) fuel valve when fuel is at the predetermined level.

13. The method of claim 12, wherein detecting fuel in the fuel pump module as reached the predetermined level includes raising a float member of a float valve.

14. The method of claim 12, wherein fluidically isolating the fuel pump module includes seating a pintle into a valve seat fluidically connected to the second pump outlet.

15. The method of claim 12, further comprising: reducing operating power of the fuel pump when the second pump outlet is fluidically isolated from the fuel pump module.

\* \* \* \* \*